United States Patent [19]
Lefebvre

[11] Patent Number: 6,001,889
[45] Date of Patent: Dec. 14, 1999

[54] POLYMERS WITH FRACTAL STRUCTURE

[75] Inventor: Michel S. M. Lefebvre, Kurrajong Heights, Australia

[73] Assignee: Steripak Pty Ltd., Sydney, Australia

[21] Appl. No.: 09/029,587

[22] PCT Filed: Sep. 4, 1996

[86] PCT No.: PCT/AU96/00550

§ 371 Date: Mar. 4, 1998

§ 102(e) Date: Mar. 4, 1998

[87] PCT Pub. No.: WO97/09352

PCT Pub. Date: Mar. 13, 1997

[30] Foreign Application Priority Data

Sep. 4, 1995 [AU] Australia .................................. PN5203

[51] Int. Cl.$^6$ ........................................................ C08S 9/00
[52] U.S. Cl. .................................................................. 521/82
[58] Field of Search ................................................. 521/82

[56] References Cited

U.S. PATENT DOCUMENTS 4,749,487  6/1988  Lefebvre ................................. 210/490

FOREIGN PATENT DOCUMENTS 4291585   8/1988  Australia .
WO 8504593 10/1985 WIPO .
WO 9506081  3/1995 WIPO .

*Primary Examiner*—Terressa Mosley-Boykin
*Attorney, Agent, or Firm*—Birch, Stewart Kolasch & Birch, LLP

[57]  ABSTRACT

A polymer having a fractal configuration of structure which is self-similar or is scale invariant at different scales. As a consequence of their fractal configuration, such polymers have superior properties as an interstitial material for the adsorption of substances, and are useful as an additive or adjunct to ion exchange, filtration and membrane separation of compounds.

11 Claims, No Drawings

POLYMERS WITH FRACTAL STRUCTURE

FIELD OF THE INVENTION

The present invention relates to a method of manufacture of polymeric substances having a fractal configuration or structure, and to the novel polymeric substances produced thereby. More specifically, the present invention relates to polymeric materials having a constructed or in-built reticulated (fractal) structure.

As a consequence of their fractal geometry or configuration, the compounds of the present invention have superior properties as an interstitial material for the adsorption of substances, and as a vehicle providing a new surface delivery system for chemicals, therapeutic drugs and the like.

PRIOR ART AND BACKGROUND

Fractal geometry has been used over the past 15 years as an analytical tool to mathematically describe curves, surfaces or volumes of a certain "roughness" when they appear equally rough or pleated under a wide range of scales. These scale invariant structures are described in terms of their fractal dimensions (called the Hausdorff dimension "d") by the Mandelbrot equation:

$$N_n^d = \text{constant } (l_o^d)$$

(Ref Mandelbrot, B., "Les Objects Fractals" - Flammarion Pans 1995).

Where
$_n$ is a gauge of measure
N is the count obtained by measuring the medium with the gauge n
$l_o$ is the characteristic length
$^d$(integer or non-integer) is the Hausdorff (fractal) dimension (dCR).

In the case of Euclidean geometry, if a segment is gauged by a half scale of its length (n=½) its N count is given by $2^1$, but for the equivalent square gauged in the same way, d=2 and its N count (or measure) is given by $2^2$, and for a cube d=3 and $N=2^3=8$, the Mandelbrot equation gives $$8(½)^3 = 1^3$$

In the case of fractal geometry, take the example of the Von Koch curve (FIG. 1) to generalise the application of the Mandelbrot equation. To form the Von Koch curve, the generator of the curve is taken from the segment lo. The segment is cut into three parts, the centre part is removed and two segments of equal length are added to form $l_1$, which is called the generator. In this case the length $l_n$ of the curve of order n is $l_{(n)} = l_o \eta^{n-1}$ and the pattern tends to a limit (the d fractal) where $d = \log_3 4 = 1.26186$

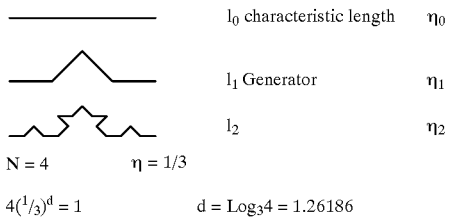

Starting with other generators, and using the same principle there is provided for example

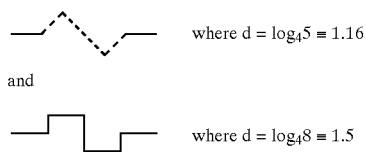

where $d = \log_4 5 \approx 1.16$ and where $d = \log_4 8 \approx 1.5$

The construction process can be further generalised using for example the following generators in a two dimensional plane

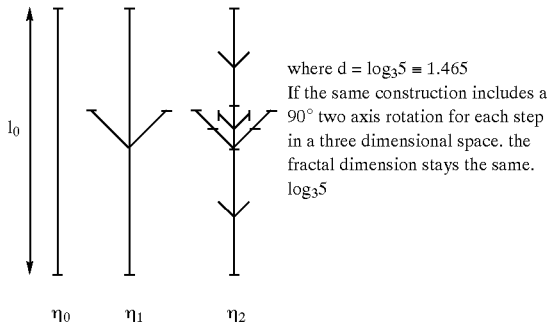

where $d = \log_3 5 \approx 1.465$
If the same construction includes a 90° two axis rotation for each step in a three dimensional space, the fractal dimension stays the same. $\log_3 5$ This concept is particularly useful in organic chemistry and has been used to model the polymerisation of various monomeric units when stereospecific polymerisation is involved.

Advanced fractal geometry concepts like multifractals applied to random walk are also routinely used to describe simple step by step polymerisation reactions when lateral reticulation occurs.

It is known that the solubility of smaller molecules is totally different to the solubility or larger molecules. The solubility of polymers varies as a function of the length of the polymer, which means that it is possible to precipitate the larger molecules before the smaller molecules are precipitated. This means that the compound structure will be determined by means of solubility step reactions.

It is an object of this invention to provide polymers having a fractal configuration, and to provide methods of preparation of fractal polymers of desired fractal dimensions.

It is another object of this invention to provide fractal polymers which, as a consequence of their fractal configuration, have superior properties for the adsorption of materials.

It is a further object of this invention to provide fractal polymers which are useful as an adjunct to the filtration or separation of compounds by conventional filters or membranes.

These are other objects of the invention will become more apparent from the following description and illustrations.

BRIEF SUMMARY OF THE INVENTION

According to one aspect of the present invention, there is provided a polymer having a fractal configuration or structure which is homogenous and self-similar, or which is scale invariant at different scales.

The fractal polymers according to the present invention have superior properties as an interstitial material for the adsorption of substances. The polymers of the present invention are useful as an additive to an adsorption material to change boundary conditions at the adsorptive surface.

Likewise, the fractal polymers of the present invention are useful as in additive to an ion exchange resin.

A further use of the fractal polymers according to the present invention is as an adjuncts to the filtration or separation of compounds by conventional filtration or membrane separation eg in reverse osmosis and nanofiltration.

According to the invention the fractal polymers are useful as an aid to dynamic filtration in that a gel layer is formed having a molecular weight cut-off well below the cut-off of the membrane being used. According to the invention it is possible to store the gel layer in immobilised form outside the filtration membrane being used.

DETAILED DESCRIPTION OF THE INVENTION

In the simple case of a polymer of polymerisation degree n, obtained by linear polymerisation of monomer $R\chi$ and represented by $[-R\chi-]_n$, it is possible to analyse the geometry of reticulation where the surpolymerisation steps can be depicted as follows:

$$P_0^r = [-Rx-]_n \quad P_1^r = [-Rx-]_{3n}^1 \quad P_2^r = [-Rx-]_{3n}^2 \quad [-Rx]_{3n}^3$$

and where additional lateral reticulation follows the steps

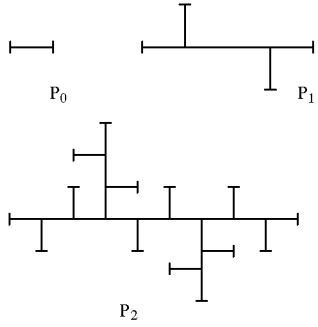

This rearrangement can be achieved for example by coagulation or condensation but in such a process, despite the fact that the end fractal dimension is invariant of the nature of the reticulation bond, its spatial orientation or the geometry of the intermediate bonds, it is necessary during the rearrangement to conserve the topological equivalence of the geometrical shape (ie to avoid folding of the chains over themselves, to avoid the creation of "double points"). (In the case of double points, the generalised Van Koch curve becomes a Peano curve with fractal dimensions equal to 2, covering all the plan, which defeats the purpose of the present invention).

The depolymerisation sequence may be represented schematically as follows, when starting with a crystalline miscelle

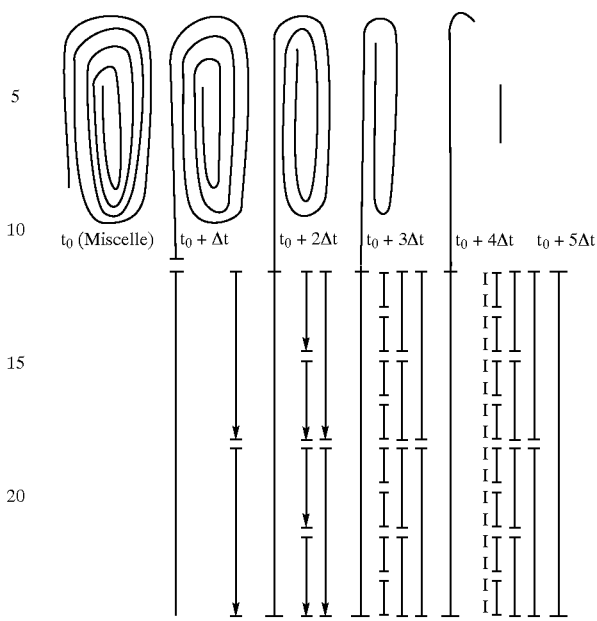

Consider for example the Peano curve generator, which shows why double points or polymeric chains folding over themselves do not follow the rules established by the generalised Van Koch generator.

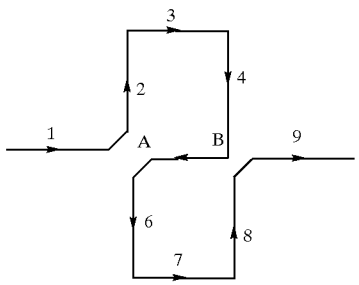

If the generator was without the double points A and B the fractal dimension of the resulting curve will approach
$$d_{lin} = \log_3 9 = 2$$
Any more folding give d > 2

Determination of Fractal Dimension of the End Products and of Their Cross Sections:

A first generalisation of the Van Koch construction is the use of Cantor sets in 1, 2 and 3 dimensional space.

In a one dimensional space a triadic Cantor set is for example $f_0^1 = [0, 1]$ $f_1^1 = [0, 1] -]1/3\,1\,2/3[$ — — Generator $f_1$ $f_2^1 = f_1[]1/9\,2/9[+]7/9\,8/9[] $ — — — — $d = \log_3 2 \equiv 0.63$ more generally $f_0(r) = [0, 1]$ $f_1(r) = [0, 1] - ]n, 1 - r[\text{with } r < 1/2$ For $f_1(r)$ as generator $d(r) = \dfrac{\log 2}{\log\left(\frac{1}{r}\right)} = \log_{\left(\frac{1}{r}\right)}$ In a two dimensional space the following squares are constructed:

$f_0^{II} = \begin{Bmatrix} x = [0, 1] \\ y = [0, 1] \end{Bmatrix}$ $f_1^{II} = f_0^{II} - \begin{Bmatrix} x = ]1/3, 2/3[ \\ y = ]1/3, 2/3[ \end{Bmatrix}$

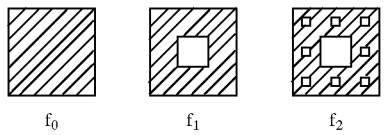

$f_0 \qquad f_1 \qquad f_2$ for $f_1$ as generator $d = \log_n 8 \equiv 1.89$

In a three dimensional space cubes are constructed:

$f_0^{III} = \begin{Bmatrix} X = [0, 1] \\ Y = [0, 1] \\ \{Z = [0, 1]\} \end{Bmatrix} \quad f_1^{III} = f_0^{III} \begin{Bmatrix} X = ]1/3, 2/3[ \\ Y = ]1/3, 2/3[ \\ Z = ]1/3, 2/3[ \end{Bmatrix}$ and then $d = \log_3 2.6 \equiv 2.96$ It is to be noted that the intersection of $f_n^{II}$ by a median is $f_n^I$ and that the intersection of $f_n^{III}$ by a median plane is $f_n^{II}$.

To achieve rearrangement without double points (ie without folding of the molecules over themselves) it is necessary to obtain some level of isotropic stretching at the interface where the reaction occurs. This is obtained according to the present invention by the superposition of a gas-producing reaction during the phase inversion process, making it possible to link the speed of formation of solid structure to the speed of local expansion.

The present invention utilises a coagulation reaction or a rearrangement reaction which simultaneously produces a gas. In other words the coagulation is produced by a reaction which needs a particular quantity of reagent, and this quantity of reagent controls the amount of gas which is produced. This means that as soon as the polymer rearranges itself at the interface of the reaction, the interface expands because it forms at the edge of the bubble.

It is important to control that the dimensional value d* associated with this interface (the bubbles themselves are in the fractal dimension) is compatible with the dimensional fractal value d of the molecular arrangement to be obtained.

This effect can be illustrated in a two dimensional plane. By extracting from a plane the discs (corresponding to the bubbles) distributed under a Poisson random distribution and with radius $r_n$ according to the step by step formation of the polymer, $r_n = \dfrac{Q}{\sqrt{n}}$ where $n = 1, 2, 3$, etc then the fractal dimension d* of the foam is given by $d^* = 2 - 2\pi Q^2$, wherein Q is related to the concentration of the foaming agent in the coagulation reaction.

When Q is very small, d* is close to 2, a continuous mass is produced. When Q is very large and close to $\dfrac{1}{\sqrt{\pi}}$ the foam becomes a very fine particulate powder. When $Q > \dfrac{1}{\sqrt{\pi}}$ the solution is unstable and expands without continuous interface and coagulation reaction cannot occur.

Computer simulations of such structures are published in Mandelbrot 'Les Objets Fractals', Flammarion 1989-P68–71.

For an analysis within a two dimensional plane, intersection of the spatial fractalised phenomena (in this case molecular rearrangement and creation of bubbles at the same time) and represented by $\begin{Bmatrix} 2 > d^* > 1 \\ 2 > d > 1 \end{Bmatrix}$ General Preparation of Fractal Structure Polymers
(a) Preparations of the original base polymers for reaction.
   (1) Polymerization, extrusion and chip manufacture, followed by purification (to remove unreacted monomer) and drying
   (2) Spinning and drawing of the polymer at very high drawing ratio to obtain a highly crystalline structure in the base polymer.
(b) Preparation of the liquid phase and controlled depolymerization (produces cut segments).
   (3) Mixing of the base crystalline polymer with a liquid reagent breaking cohesion bonds (eg the hydrogen bonds) to unfold the polymer miscelle in a slow controlled reaction (ie step-by-step unfolding).
   (4) Addition to the reagent if necessary of a depolymerization agent (to cut the structure).
   (5) Addition to the reagent if necessary of a complementary reagent to permit lateral grafting.
   (6) Controlled maturation (controlled parameters being time and temperature).
(c) Phase Inversion
   (7) Preparation of a mixture of a non-solvent liquid for the polymer and a foaming reagent, soluble in this mixture, and capable of producing a gas by reaction with the dissolution reagent of the base polymer.
   (8) Coagulation reaction of (b) in (c) by mixing, film forming of (b) and immersion in (c), or extrusion of (b) and (c).

Choice of Solvent (3) and Non-Solvent (7)
Solvents are classed according to their solubility parameter δ (Cal/cc)½, and chosen with δ values very close or equal to the δ for the polymer $\delta$ solv$_3$, #$\delta$ poly or $\delta$ solv$_3$=$\delta$ poly Solvent (7) is chosen as a non-solvent of the polymer and with $\delta$ solv$_n$#$\delta$ poly.

Choice of Polymers and Maturation Temperatures

The technology is particularly adapted but not limited to thermoplastic polymers of semi-crystalline structure (and very easy to apply to polymers with high solubility parameter $\delta$>10), and where the glass transition temperature $T_g$ is high. Generally, the maturation temperature has to be maintained below $T_g$.

The table below gives examples of combinations of polymers (with $T_g$ and $\delta$), solvents (3) and non-solvents (7).

| Polymer | $T_g$ °C. | $\delta$ (H) (cal/cc)$^{1/2}$ | Solvent (3) | $\delta$ (H) (cal/cc)$^{1/2}$ | Non-Solvent (7) | $\delta$ (H) (cal/cc)$^{1/2}$ |
|---|---|---|---|---|---|---|
| Vinyl Polymers | | | | | | |
| Polyacrylonitrile | 97 | 12.5–15.4 (12.6) | (–1,2-Propylene carbonate) | 13.3 | hexane | 7.3 |
| $\left[\text{CHCH}_2\atop\text{CN}\right]_n$ | | | (Ethylene carbonate) | 13.4 | Methylene chloride | 9.7 |
| Polyesters | | | | | | |
| Polyethyleneteraphthalate (cryst) | 81 | 9.7–10.7 (10.0) | M-Cresol | 10.2 | hexane | 7.3 |
| $\left[\text{OCH}_2\text{CH}_2\text{OC(=O)}-\text{C}_6\text{H}_4-\text{C(=O)}-\text{C}\right]_n$ | | | | | | |
| Poly $\epsilon$ caprolactam | 40 | 12.7 | Ethylene carbonate | 13.4 | Water | 23.4 |
| $[-\text{NH}-(\text{CH}_2)_5-\text{C(=O)}-]_n$ | | | Formic acid | 12.1 | hexane | 7.3 |
| Polyhexamethylene | | | | | | |
| adipamide (Nylon 6.6) | 50 | 13.7 | Dimethyl sulfoxide (DMSO) | 12.0 | Water | 23.4 |
| | | | Formic acid | 12.1 | hexane | 7.3 |
| $[-\text{NH}-(\text{CH}_2)_8\text{NHC(=O)}-(\text{CH}_2)_4-\text{C(=O)}-]_n$ | | | | | | |

Applications

Non-limiting examples of applications or uses of the fractal polymers according to the present invention are described below. Typically, the fractal polymers are in the form of a "fluff" (open sponge), or a powder, or a film. Some embodiments of the fractal polymers according to the present invention have a surface area of the order of 100,000 m$^2$/gm.

(a) Fluff or Powder

Additive to adsorption material to change boundary conditions at the adsorptive surface to enhance greatly the efficiency (and the useable capacity) of the material.

Additive to ion exchange resins for similar effect to the above.

Additive to "to be fitered" material during membrane processes such as microfiltration, ultrafiltration or nanofiltration to change boundary conditions and to help gel layer disturbance to increase specific flux.

Additive to cleaning fluids or to cleaning powders (eg detergents) to improve wiping ability.

Cleaning agents for various applications (cosmetics, soaps etc.).

Filtration aid for dynamic filter; the fractal polymer forms a surface layer which is much finer than the filter itself.

Support for compaction—like a sponge, but because of its divided structure, there are many more points of support than on a normal sponge. The material is less expensive than other materials used for this purpose, and reduces surface pressures.

Support for biodegradability in polymer mix.

Oil entrapment and general entraponents in pollution control. Encapsulation for slow release of active compounds.

(b) Film surface delivery system for specific drugs tailored abrasive friction reduction and oil entrapment at the surface.

Although exemplary embodiments of the present invention have been shown and described, it will be apparent to those having ordinary skill in the art that a number of changes, modifications or alterations to the invention described herein may be made, none of which depart from the spirit of the present invention. All such changes, modifications, and alterations should therefore be seen as being within the scope of the present invention.

It should be appreciated that the present invention provides a substantial advance in the manufacture of polymeric substances having a fractal configuration or structure providing all of the herein-described advantages without incurring any relative disadvantages.

I claim:

1. A polymer having a fractal configuration or structure which is homogenous and self-similar and strictly scale invariant at different scales, and having a fractal or Hausdorff dimension d which is not an integer, according to the Mandelbrot equation:

$$N_\eta{}^d = \text{constant}(l_o{}^d)$$

wherein

η is a gauge of measure

N is the count obtained by measuring the medium with the gauge η

$l_o$ is the characteristic length d is the Hausdorff (fractal) dimension (dER).

2. A polymer as claimed in claim 2, in the form of an open sponge or "fluff".

3. A polymer as claimed in claim 2, in particulate or powdered form.

4. A polymer as claimed in claim 2, in a film or membrane form.

5. A method of manufacturing a polymer having a fractal configuration or structure which is homogenous and self-similar and strictly scale invariant at different scales, and having a fractal or Hausdorff dimension d which is not an integer, according to the Mandelbrot equation:

$$N_\eta{}^d = \text{constant}(l_o{}^d)$$

wherein

η is a gauge of measure

N is the count obtained by measuring the medium with the gauge η

$l_o$ is the characteristic length d is the Hausdorff (fractal) dimension (dER)

said method comprising:

preparing a base polymer by mixing and polymerization of monomers;

spinning and drawing of the base polymer at a very high drawing ratio to obtain a highly crystalline structure in the base polymer;

mixing the base crystalline polymer with a liquid reagent to break hydrogen bonds in the polymer for a step-by-step unfolding of the polymer miscelle;

optionally adding a depolymerization agent;

optionally adding a reagent to produce lateral grafting on the base polymer;

controlled maturation of the polymer mix;

phase inversion of the polymer; and coagulation, film forming or extrusion of the polymer.

6. A polymer according to any one of claims 2–5, which is an additive to an adsorption material to change boundary conditions at the adsorptive surface, due to the fractal geometry of the surface of the polymer.

7. A polymer according to any one of claims 2–5, which is an additive to an ion exchange resin to change boundary conditions at the ion exchange surface, due to the fractal geometry of the surface of the polymer.

8. A polymer according to any one of claims 2–5, which is an adjunct to the filtration or separation of compounds by conventional filters or membranes in reverse osmosis, nanofiltration or ultrafiltration.

9. A polymer according to any one of claims 2–5, which is a filtration aid in dynamic filtration, wherein the polymer forms a surface layer or gel layer having a molecule weight cut-off less than the molecule weight cut-off of the supporting filter or membrane.

10. A polymer according to any one of claims 2–5, which is an additive to a cleaning composition.

11. A polymer according to any one of claims 2–5, which is an additive to a cosmetic preparation or a soap composition.

* * * * *